Nov. 20, 1956 H. T. AVERY ET AL 2,771,505

READOUT DEVICES

Filed July 21, 1953

INVENTORS.
Harold T. Avery.
Robert W. Hampton.

United States Patent Office 2,771,505

Patented Nov. 20, 1956

2,771,505

READOUT DEVICES

Harold T. Avery and Robert W. Hampton, Oakland, Calif., assignors to Marchant Research, Inc., a corporation of California Application July 21, 1953, Serial No. 369,483

8 Claims. (Cl. 178—23)

The present invention relates to readout devices for computers and more particularly concerns a control and drive system for ferromagnetic readout devices.

Present day electronic computing equipment is characterized by its relatively high speed of operation. When such equipment is employed in operations which require numerous computations resulting in a single answer, there is a favorable comparison between the total computing time and the time required to place the answer into readable form by means such as an electric typewriter. On the other hand, when a computer is employed in a type of operation resulting in a voluminous output of information, the inherently slow speed of operation of electric typewriters or other similar readout devices often becomes the limiting factor in the speed of the total computing operation.

To meet the need of higher readout speeds, it has been proposed that a process of ferromagnetic printing be employed. This process comprises magnetizing the image of a desired character on the surface of a permeable medium, exposing that surface to an ink-laden ferromagnetic dust or liquid whereby only the magnetized image becomes inked, and then pressing a paper surface against the medium whereby the image is transferred in ink to the paper.

For each character that is to be printed, a magnetic core is shaped in the form of that character and constitutes a plug which is mounted on a rotatable character disc, there being a respective disc bearing a circumferential order of such character plugs corresponding to each column of print. Opposite each disc is a "pulsing shoe" comprising a pulsing coil surrounding part of a permeable core. The core has a face that opposes a related ordinal character disc. A magnetic tape is passed between the array of character discs and pulsing shoes and receives a magnetic image of any character that is opposite a pulsing shoe when the coil on that shoe is energized.

Since digital or alphabetic information is ordinarily printed in straight horizontal lines, it is necessary to provide means for arranging the images on the magnetic tape in such lines while the tape is in continuous motion at a uniform speed. Suppose, for example, that a particular disc assembly contains character plugs for decimal information, i. e., several ordinal character discs, each disc bearing a respective plug for each digit 0–9. If each pulsing shoe is pulsed when the selected digit in the related order is opposite a fixed index mark on the shoe, then the digit images for all orders will be in a straight line on the moving tape only if the same digit is selected in each order. This is because the plugs representing the several digits on the discs are spaced around the peripheries of the discs, and while the disc assembly is rotating to align a selected digit with its pulsing shoe, the tape is advancing, therefore the tape is in different positions for alignment of different digits with a pulsing shoe.

In the ferromagnetic readout devices of the prior art, substantially straight lines of magnetic images on the tape have been achieved primarily by advancing the tape intermittently, one printing line at a time, and then stopping the tape while the character discs make a complete rotation. This system has a marked speed limitation which inheres from the obvious inertia problems involved in fast starting and stopping of parts having a finite mass.

The present invention constitutes an arrangement whereby magnetic character images can be formed in substantially straight lines on the tape at high speed employing continuously rotating character discs and a continuously advancing tape.

It is therefore a principal object of the present invention to magnetize selected ordinal character images at relatively high speed and in substantially straight lines on a magnetic tape by moving the tape at a uniform speed between fixed ordinal pulsing shoes and a continuously rotating disc assembly carrying magnetically permeable character plugs.

Other objects of the present invention are:

To provide improved control means for ferromagnetic character printing devices.

To provide an improved timing means for such devices.

Other objects of the present invention will appear from the description, reference being made to the drawing in which.

*General description*

The present invention is described hereinafter as being embodied in a device for reading out decimal information from a computer. It will be apparent, however, that the invention applies equally well to devices for reading out alphabetic information or for reading out numerical information which is expressed in notations other than the decimal system.

A character disc is provided for each denominational order of the present readout device, each disc having the decimal digits 0–9 formed of magnetically permeable material and evenly spaced in numerical order around its periphery. A fixed pulsing shoe is disposed in spaced relation to each character disc and a thin magnetizable tape is interposed between the disc assembly and the pulsing shoes. Decimal information is received by a respective coil surrounding a part of each pulsing shoe. The character discs are rotated together at a uniform speed, and the tape is passed between the discs and the pulsing shoes at a uniform speed in timed relation to the rotation of the discs. The decimal information which is received by the pulsing shoe coils is timed, by means hereinafter described, such that a pulse which represents a given decimal digit 0–9 is received by its related pulsing shoe when the given digit on the related character disc is opposite an imaginary fixed index position on the moving tape representing the desired position of a line of information on the tape. Energization of the coil on a given pulsing shoe completes a magnetic circuit from the pulsing shoe through the tape to the character disc, and magnetizes an image of the corresponding digit on the tape.

*Image magnetizing assembly*

Figure 1:
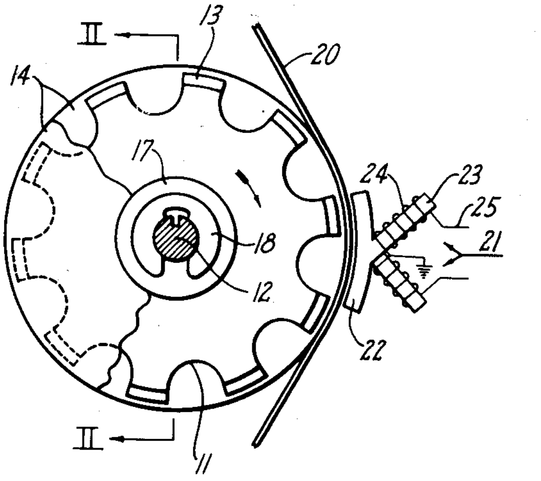
Fig. 1 is a left side view of the character disc assembly, partly broken away.
Figure 2:
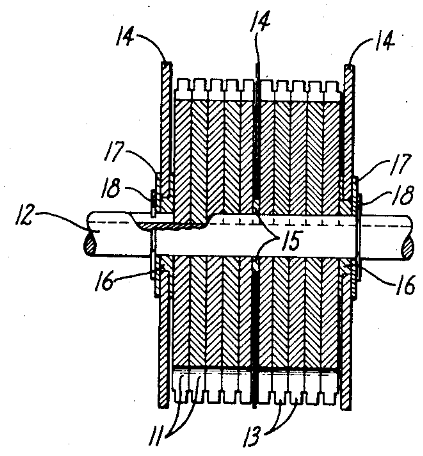
Fig. 2 is a sectional front view of the character disc assembly taken on the line II—II of Fig. 1.

The present invention is illustrated in a device having ten readout orders. Referring to Figs. 1 and 2, ten character discs 11 are keyed to a common shaft 12 for rotation therewith. Each disc 11 has ten character plugs 13 evenly spaced around its periphery. The discs and plugs are formed of magnetically permeable material and the latter are shaped to form the respective decimal digits 0–9. Each disc 11 and its ten character plugs may be integrally formed, as shown, or the plugs may be made separately and mounted in suitable recesses in the discs. A disc-type roller 14 is rotatably mounted on a spacer 15 which in turn is rotatably mounted on shaft 12 between the fifth and sixth character discs 11. A respective spacing hub 16 is keyed to shaft 12 at each end of the character disc assembly and a respective roller 14 is rotatably mounted on each hub 16. A respective washer 17 is freely mounted on shaft 12 adjacent each hub 16 and the entire assembly is restrained from lateral movement by a respective spring clip 18 mounted in an annular groove outboard of each washer 17. A thin magnetizable tape 20 which is mounted on a reel system (not shown) is passed over rollers 14. The radius of the rollers is slightly larger than the largest radius of the character discs; therefore, tape 20 is maintained at a fixed distance from the character plugs 13 throughout the distance in which the tape is in contact with the rollers. Since rollers 14 are rotatably mounted on shaft 12, they rotate independently of that shaft, and their speed of rotation is controlled by the speed of advance of tape 20.

A respective pulsing shoe 21 is associated with each character disc 11. Each pulsing shoe comprises a face portion 22 disposed in spaced relation with the corresponding ordinal character disc, and a core arm 23 disposed at an angle to the face portion. A coil 24 wound on the core arm of each pulsing shoe is grounded at one end and has an input lead 25 at its remaining end for receiving pulses representative of decimal information. The core arms 23 of ordinally adjacent pulsing shoes may be displaced at different angles to their respective face portions 22, as shown in Fig. 1, in order to prevent interaction between ordinally adjacent pulsing coils.

The magnetic tape 20 may be considered as comprising a series of imaginary, regularly spaced, straight printing lines upon which the magnetic digit images are to be impressed. Each printing line may be considered as having the same height as the digit which is formed on the face of a character plug. The speed of advance of the tape bears a timed relation to the speed of rotation of the discs 11 such that one printing line on the tape traverses the face portions 22 of the pulsing shoes 21 during each rotation of discs 11. Therefore, during each rotation of discs 11, all ten character plugs on a given disc rotate past the same printing line on the tape while that printing line is traversing the pulsing shoes. It may be desirable to have the face of each pulsing shoe be as long as possible (subtend a maximum angle at the center of the related character disc), in order to obtain the minimum ratio between the respective velocities of the tape and the character plugs. This minimizes the rotational velocity of the character discs for any given tape speed. However, the face of each pulsing shoe cannot cooperate with more than one character plug at any one time, or an erroneous multiple imprint would occur in response to a single pulsing. Therefore, the maximum length of the face of each pulsing shoe is measured by the arcuate distance separating the centers of two consecutive character plugs, or $$\frac{360^\circ}{n}$$

where "$n$" is the number of character plugs on a disc. Fig. 1 illustrates a pulsing shoe of approximately the maximum length.

*Timing system*

The following timing system is provided for timing the receipt of pulses on leads 25 (Fig. 1) in such a manner that all of the character images magnetized on tape 20 fall squarely on the printing lines.

Each rotation time of the discs 11 may be considered as comprising ten digit intervals. A digit interval begins when a character plug is first fully opposite the face portion 22 of its related pulsing shoe and ends when the trailing edge of that plug is aligned with the final edge of the pulsing shoe face portion.

Figure 3:
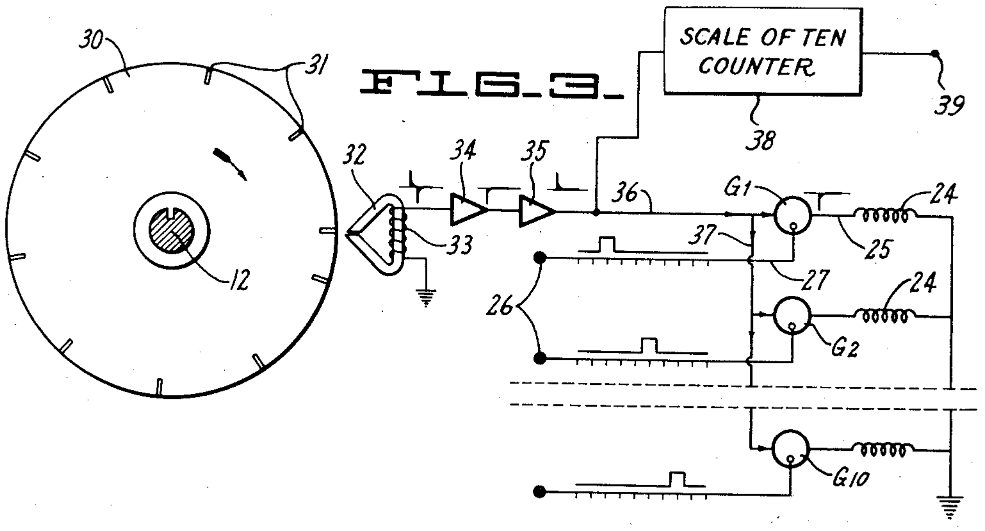
Fig. 3 is a left side view of the timing disc with a schematic wiring diagram of the magnetic timing head and the control circuits.

Referring to Fig. 3, square pulses representing decimal digits are received at ten ordinal terminals 26 (only three such terminals being shown). These pulses may be received from a computer output such as shown at output leads 518 in Fig. 9f of Patent No. 2,624,507, issued January 6, 1953, to B. E. Phelps. While discs 11 are making one complete rotation, a decimal pulse is received, during one or another of the ten digit intervals, at each terminal 26 that corresponds to an order in which a digit is to be printed. The value of the decimal digit which is represented by a decimal pulse is determined by the digit interval during which that pulse is received at its related terminal 26.

Each decimal pulse received at a terminal 26 is transmitted by a respective lead 27 to the arming terminal of an ordinally related normally closed gate G1–G10, which may, for example, be of the type shown in Fig. 3 of the copending application Serial No. 344,025, filed March 23, 1953, by George B. Greene, and fully described in that application. The timing and width of a decimal pulse are such that the pulse arms its related gate G1–G10 for the amount of time that is required for the corresponding character plug 13 (Fig. 1) to traverse its related pulsing shoe 21. At substantially the precise moment that each character plug is aligned with a printing line on the tape, a pulsing signal interrogates each gate G1–G10, in a manner described below; but since each gate is armed for only one digit interval during each rotation of discs 11, the pulsing signal in each order is synchronized with the alignment of only the selected ordinal character plug and the printing line. The synchronizing means are as follows.

A timing disc 30 (Fig. 3) is keyed to the character disc shaft 12 for rotation therewith. Timing disc 30 (Fig. 3) and character disc 11 (Fig. 1) are shown in the zero, or reference position. Disc 30 is formed of nonmagnetic material but has a series of ten magnetized inclusions 31 spaced around its periphery. A magnetic timing head 32 having a coil 33 is disposed adjacent the rotary path of the magnetized inclusions 31. The coil 33 is energized each time an inclusion 31 passes adjacent the timing head, and impresses a double-ended signal, as shown in Fig. 3, on amplifier 34 which has a class B or a class C bias and which may be of the type shown in Fig. 2.14, page 46, of Elmore and Sands, "Electronics," National Nuclear Energy Series, Division V—volume 1, McGraw-Hill, New York, 1949. Amplifier 34 responds to and inverts only the positive-going half of each signal from coil 33. The resulting negative pulse is fed to an amplifier 35 which is normally biased to conduction and which amplifies and inverts the negative pulse to produce a positive interrogation pulse. Amplifier 35 is biased for class A operation and may be of the type shown in Elmore and Sands, "Electronics" supra.

Each interrogation pulse from amplifier 35 is transmitted by a pair of leads 36 and 37 to all of the gates G1–G10 in parallel and is amplified by any armed gate to energize its related pulsing coil 24. Therefore, during each rotation of disc 11 and 30, ten interrogation pulses are generated and employed to interrogate all of the gates G1–G10. The disposition of the magnetized inclusions 31 about the periphery of disc 30 is such that one interrogation pulse is generated during each digit interval at the moment when the character plug 13 (Fig. 1) corresponding to that digit interval is squarely aligned with the related printing line on tape 20.

A scale-of-ten counter, shown at 38 in Fig. 3, may be employed to furnish pulses for synchronizing the readout device with the computer. Through the use of counter 38, a periodic synchronizing pulse is obtained at terminal 39 even though the inclusions of timing disc 30 are not equally spaced. In the present example, the synchronizing pulse from terminal 39 may be used to control the multivibrator pulse generator shown as MV in Fig. 9a of the previously mentioned Phelps Patent No. 2,624,507. Many suitable scale-of-ten counters are shown in the prior art, for example, in Fig. 4.3, page 211, of Elmore and Sands, "Electronics," supra. Also, suitable methods of applying a synchronizing voltage to a pulse generator are discussed in chapter 2, section 4.4 (b) of Elmore and Sands, "Electronics."

It has been shown that in order to maintain a straight printing line, each character plug must overtake the current printing line on the tape before the related pulsing coil 24 is energized. Since the tape continues moving past the pulsing shoes while discs 11 are rotating, each successive character plug finds the printing line advanced farther along the pulsing shoe. Therefore, each magnetized inclusion except the one corresponding to the digit "0" is displaced from the next preceding inclusion by an angle equal to one-tenth of a circle plus a compensating angle so that each respective inclusion can energize the pulsing coils only at the instant when corresponding character plugs are squarely aligned with the current printing line. The maximum compensating angle will be seen to equal one-ninth times [the angle subtended by the space between two consecutive character plugs on discs 11]. In general, where a character disc bears $n$ character plugs, each inclusion except the first is displaced from the next preceding inclusion by an angle equal to $$\frac{360°}{n}+\frac{b}{n-1}$$

where "$a$" is the angular separation of the adjacent edges of two consecutive character plugs, and where $b \leqq a$. Although each character plug 13 (Fig. 1) is spaced from the preceding plug by the constant angle $$\frac{360°}{n}$$

(center-to-center) and each magnetic inclusion 31 (Fig. 3) except the first is spaced from the preceding inclusion by the constant angle $$\frac{360°}{n}+\frac{b}{n-1}$$

nevertheless, the angular separation between pairs of corresponding character plugs and magnetic inclusions is not constant. This is due to the fact that a magnetic inclusion of rank "$w$" leads its corresponding character plug by the angle $$wx\frac{b}{n-1}$$

and "$w$" has a unique value for each character plug and magnetic inclusion pair.

Figure 4:
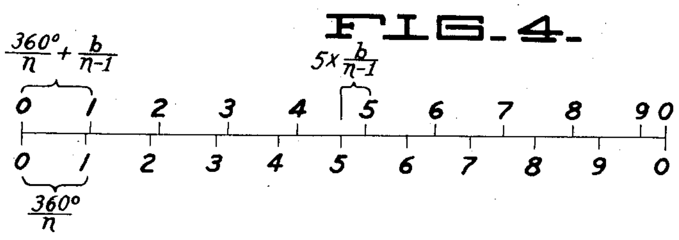
Fig. 4 is a linear diagram showing the relative positions of character plugs and timing inclusions.

Fig. 4 illustrates the angular relationship between each character plug and its corresponding magnetic inclusion. The horizontal base line has a total length representing 360°. The vertical marks extending downward represent placement of character plug centers, and are evenly spaced along the base line; the upwardly-extending vertical lines represent placement of magnetic inclusion centers and, except for Nos. "9" and "0," also are evenly spaced. Since the spacing between inclusions is greater than that between character plugs, by the angle $$\frac{b}{n-1}$$

there is an increasing separation between ranking pairs, this separation being, in each case, $$wx\frac{b}{n-1}$$

The separation of plug and inclusion of rank "5" is illustrated as $$5x\frac{b}{n-1}$$

*Summary of operation*

In summary, the decimal pulses on terminals 26 arm ordinal gates G1–G10 during the selected ordinal digit intervals. An interrogation pulse passes through each gate at a predetermined instant during its armed digit interval and energizes its related pulsing shoe which magnetizes an ordinal digit image on the tape according to the ordinal character plug which is opposite the pulsing shoe during the selected digit interval. The interrogating pulses are timed such that any character plug is aligned with the same printing line on the moving tape at the moment the pulsing shoe is energized to magnetize the image of the digit appearing on that character plug.

We claim:

1. In a device of the class described having, ordinally spaced cyclically movable members bearing ordinal characters formed of magnetically permeable material, ordinally spaced pulsing shoes disposed in spaced relation to the cyclic path of said characters, and a movable magnetic tape; the combination of, means for continuously moving said members at a uniform cyclic speed, means for continuously moving said tape between said members and said pulsing shoes at a uniform speed in timed relation to the cyclic speed of said members, means for producing ordinal signals corresponding to ordinally selected ones of said characters, and a circuit operable under control of the signal producing means for independently energizing each pulsing shoe synchronously with the alignment of each ordinally selected character and a predetermined transverse line on said tape.

2. In a device of the class described having, ordinally spaced rotatable character discs, an ordinal set of the admissible marks of a numerical system formed of magnetically permeable material and spaced in numerical sequence around the periphery of each disc, a respective ordinal pulsing shoes disposed in spaced relation to each disc, and a movable magnetic tape; the combination of, means for continuously rotating said discs at a uniform speed, means for moving said tape between the discs and the pulsing shoes at a uniform speed in timed relation to the rotary speed of the discs, means for producing ordinal signals corresponding to ordinally selected ones of said marks, and a circuit operable under control of the signal producing means for independently energizing each pulsing shoe synchronously with the alignment of each ordinally selected mark and a predetermined transverse line on said tape.

3. In a device of the class described having, a cyclically movable member bearing indicia formed of magnetically permeable material, a pulsing shoe disposed in spaced relation to the cyclic path of said indicia, and a movable magnetic tape; the combination of, means for continuously moving said member at a uniform cyclic speed, means for continuously moving the tape between said member and the pulsing shoe at a uniform speed in timed relation to the cyclic speed of said member, means for producing a signal corresponding to a selected one of said indicia, and a circuit operable under control of the signal producing means for energizing the pulsing shoe synchronously with the alignment of the selected indicium and a predetermined index position on said tape.

4. In a device of the class described: the combination of; a member moving at a uniform cyclic speed and bearing an ordinal set of indicia formed of magnetically permeable material; a uniformly moving magnetic medium having a path adjacent the path of said indicia; an electromagnetic means cooperating with said set of indicia and operable when energized for establishing a magnetic circuit through the indicium nearest the electromagnetic means and said medium; a gate having an input section, an arming section and an output section; means for applying a signal to the input section of said gate synchronously with the alignment of each indicium and a predetermined index position on said medium; information input means connected to the arming section of the gate for arming said gate during a period of alignment of the electromagnetic means and the indicium corresponding to the input information; and a connection between the output section of the gate and the electromagnetic means for energizing the latter in response to a signal received at the input section of the gate during the period in which the gate is armed.

5. In a device of the class described having; a character disc; a set of ten digits 0–9 formed of magnetically permeable material and evenly spaced in numerical sequence around the periphery of the character disc; a pulsing shoe disposed in spaced relation to the cyclic path of said digits; and a movable magnetic tape: the combination of; means for continuously rotating said disc at a uniform speed; each rotation of the character disc being divided into ten equal digit intervals; means for continuously moving the tape between the character disc and the pulsing shoe at a uniform speed in timed relation to the rotary speed of the character disc; a timing disc; a respective indicium on the timing disc corresponding to each digit 0–9, each indicium except the first being spaced from the next preceding indicium by an angle, at the center of the timing disc, equal to one-tenth of a circle plus one-ninth of the angle, at the center of the character disc, subtended by the space between two consecutive ones of said digits; a transducer disposed adjacent the path of said indicia for generating a timing signal in response to the passage thereby of each indicium; a normally closed gate having an input section, an output section, and an arming section; means for applying each of said timing signals to the input section of said gate; information input means connected to the arming section of the gate for arming said gate during a selected digit interval corresponding to a selected digit; and a connection between the output section of the gate and the pulsing shoe for energizing the latter in response to a timing signal received at the input section of the gate during the digit interval in which the gate is armed.

6. In a device of the class described having; a character disc, a set of $n$ characters formed of magnetically permeable material and evenly spaced in sequence around the periphery of the character disc; a pulsing shoe disposed in spaced relation to the cyclic path of said characters; and a movable magnetic tape: the combination of; means for continuously rotating said disc at a uniform speed, each rotation of the character disc being divided into "$n$" equal character intervals; means for continuously moving the tape between the character disc and the pulsing shoe at a uniform speed in timed relation to the rotary speed of the character disc; a timing disc; a respective indicium on the timing disc corresponding to each of the "$n$" characters, each indicium except the first being spaced from the next preceding indicium by an angle, at the center of the timing disc, equal to $$\frac{360°}{n} \text{ plus } \left[\frac{1}{n-1}\right.$$

times the angle, at the center of the character disc, subtended by the space between two consecutive ones of said characters]; a transducer disposed adjacent the path of said indicia for generating a timing signal in response to the passage thereby of each indicium; a normally closed gate having an input section, an output section, and an arming section; means for applying each of said timing signals to the input section of said gate; information input means connected to the arming section of the gate for arming said gate during a selected character interval corresponding to a selected character; and a connection between the output section of the gate and the pulsing shoe for energizing the latter in response to a timing signal received at the input section of the gate during the character interval in which the gate is armed.

7. In a device of the class described having; a character disc; a set of ten digits 0–9 formed of magnetically permeable material and evenly spaced in numerical sequence around the periphery of the character disc; a pulsing shoe disposed in spaced relation to the cyclic path of said digits; and a movable magnetic tape: the combination of; means for continuously rotating said disc at a uniform speed; each rotation of the character disc being divided into ten equal digit intervals; means for continuously moving the tape between the character disc and the pulsing shoe at a uniform speed in timed relation to the rotary speed of the character disc; a timing disc; a respective indicium on the timing disc corresponding to each digit 0–9, each indicium except the first being spaced from the next preceding indicium by an angle, at the center of the timing disc, equal to one-tenth of a circle plus a maximum of one-ninth of the angle, at the center of the character disc, subtended by the space between adjacent extremities of two consecutive ones of said digits; a transducer disposed adjacent the path of said indicia for generating a timing signal in response to the passage thereby of each indicium; a normally closed gate having an input section, an output section, and an arming section; means for applying each of said timing signals to the input section of said gate; information input means connected to the arming section of the gate for arming said gate during a selected digit interval corresponding to a selected digit; and a connection between the output section of the gate and the pulsing shoe for energizing the latter in response to a timing signal received at the input section of the gate during the digit interval in which the gate is armed.

8. In a device of the class described having; a character disc, a set of $n$ characters formed of magnetically permeable material and evenly spaced in sequence around the periphery of the character disc; a pulsing shoe disposed in spaced relation to the cyclic path of said characters; and a movable magnetic tape: the combination of; means for continuously rotating said disc at a uniform speed, each rotation of the character disc being divided into "$n$" equal character intervals; means for continuously moving the tape between the character disc and the pulsing shoe at a uniform speed in timed relation to the rotary speed of the character disc; a timing disc; a respective indicium on the timing disc corresponding to each of the "$n$" characters, each indicium except the first being spaced from the next preceding indicium by an angle, at the center of the timing disc, equal to $$\frac{360°}{n}+\frac{b}{n-1}$$

where "$a$" is the angle subtended, at the center of a character disc, by the space between adjacent extremities of two consecutive character plugs, and $b \leqq a$; a transducer disposed adjacent the path of said indicia for generating a timing signal in response to the passage thereby of each indicium; a normally closed gate having an input section, an output section, and an arming section; means for applying each of said timing signals to the input section of said gate; information input means connected to the arming section of the gate for arming said gate during a selected character interval corresponding to a selected character; and a connection between the output section of the gate and the pulsing shoe for energizing the latter in response to a timing signal received at the input section of the gate during the character interval in which the gate is armed.

References Cited in the file of this patent

UNITED STATES PATENTS

| | | |
|---|---|---|
| 2,359,617 | Bryce | Oct. 3, 1944 |
| 2,558,187 | Marrison | June 26, 1951 |
| 2,658,683 | Rabenda | Nov. 10, 1953 |
| 2,677,725 | Schuler | May 4, 1954 |
| 2,736,770 | McNaney | Feb. 28, 1956 |

OTHER REFERENCES

Ferromagnetography—High Speed, by T. M. Berry and J. P. Hanna, Gen. Electric Review, July 10, 1952; pp. 20–22 and 61 only.